US006813128B2

(12) United States Patent
Hasenauer et al.

(10) Patent No.: US 6,813,128 B2
(45) Date of Patent: Nov. 2, 2004

(54) HIGH VOLTAGE BIAS FEEDBACK FOR DIAGNOSTIC PURPOSES

(75) Inventors: Charles H. Hasenauer, Rochester, NY (US); Joseph J. Furno, Pittsford, NY (US)

(73) Assignee: NexPress Solutions LLC, Rochester, NY (US)

( * ) Notice: Subject to any disclaimer, the term of this patent is extended or adjusted under 35 U.S.C. 154(b) by 610 days.

(21) Appl. No.: 09/866,174

(22) Filed: May 25, 2001

(65) Prior Publication Data

US 2003/0035258 A1 Feb. 20, 2003

(51) Int. Cl.[7] .................................................. H02H 3/08

(52) U.S. Cl. ......................... 361/93.1; 361/88; 361/225

(58) Field of Search ......................... 361/93.1, 88, 225; 399/67; 250/325

(56) References Cited

U.S. PATENT DOCUMENTS 3,934,141 A * 1/1976 Vargas, Jr. .................. 250/325
5,132,869 A 7/1992 Nakaya ...................... 361/233
6,243,545 B1 * 6/2001 Jewell ......................... 399/67

* cited by examiner

*Primary Examiner*—Brian Sircus
*Assistant Examiner*—James A Demakis

(57) ABSTRACT

A method and apparatus for identifying potential problems within systems having rotating biased components. The system employs diagnostics to the rotating biased components to provide status feedback to the machine's control unit when any type of bias fault has occurred. The system then responds to this fault signal making it possible to stop operation and alert the machine operator. The present invention also discloses a method for detecting open load, over load, shorted load and intermittent contact with the load or arcing conditions, as well as power supply output failure in a bias system. A digital signal that may be may be sensed by interrupt or sampling methods and filtered appropriately with software is provided to a machine control system. The result is that bias failures may be detected automatically by machine control. The system also provides a method to alert the operator service personnel on which area of the machine to service.

19 Claims, 3 Drawing Sheets

HIGH VOLTAGE BIAS FEEDBACK FOR DIAGNOSTIC PURPOSES

BACKGROUND OF THE INVENTION

1. Field of the Invention

The present invention relates to diagnostics and controls for voltage bias applications in electrophotographic imaging systems, and more particularly to those systems employing feedback of load bias to regulate voltage.

2. Description Relative to the Prior Art

In an electrophotographic imaging systems, the movement of toner is controlled in part through electrostatic forces. Components of the system are biased at different electrical potentials in order to set up fields to attract or repel electrostatically charged toner particles. The loss of bias, or incorrect bias, on parts of the system can adversely impact the quality of the image produced by the system.

One source of faults in the biased systems is arcing between surfaces at different potentials. This disturbs the bias potential. Some high voltage systems detect arcing and indicate errors. Other systems monitor the output of the bias power supply to check for disturbances in the voltage. While these prior art systems are basically effective for their intended purposes, they ignore one of the prime sources of failure that occurs within rotating biased components. Failure occurs in contact used within rotating biased components. This failure can be caused by wear of the brushes used to apply bias to the rotating component. In systems where rotating biased components are removed on a regular basis, electrical connectors wear and have an especially strong chance of potential failure. Systems having multiple imaging units employed to produce multiple color images can be very difficult to troubleshoot and determine where a fault is occurring. The simple evaluation of defects after they have occurred is not a workable solution. There needs to be a diagnostic tool available to evaluate bias problems before they result in defects. Once the defect has occurred, it is simply too late.

An example of a prior art teaching for controlling voltages within image forming apparatus is U.S. Pat. No. 5,132,869, issued to Nakaya (Nakaya). This reference illustrates one prior art method for controlling voltages that are applied to components within electrophotographic apparatus by keeping current at a predetermined level. Nakaya accomplishes this control by using timing configurations to the control pulse width modulation in response to the detected output voltage. However, the actual component to which power is applied to is not closely observed. Instead, the voltage across the component is observed. Nakaya discloses a manner for the current regulation of corona charging loads charges that are regulated within Nakaya by monitoring the actual drum current to ground through a sensing element placed between the drum and ground. The current to that sensing element is then monitored periodically by machine control, and the constant voltage output of the corona charger power source is adjusted. Nakaya senses the current returning to the power supply from the machine ground (or the grid bias output of the primary charger). The output voltage is continuously adjusted to regulate the current that the charger delivers. (Column 6, line 15 of Nakaya describes this as part of the current control.) This is a common technique used within the prior art for current regulated corona charger power supplies. While Nakaya is effective to adjust output voltages within certain limits, this prior art teaching does little to indicate problems within components using rotating contacts.

In view of the foregoing description, it should be apparent that there remains a need within the prior art for a system that can assist in identifying potential problems within rotating biased components. It is, therefore, desirable to employ diagnostics on these systems having rotating biased components to provide status feedback to the machine's control unit when any type of bias fault has occurred. The system could then respond to this fault signal making it possible to stop imaging and alert the machine operator that bias faults may adversely affect the image quality of the prints being produced.

SUMMARY OF THE INVENTION

The invention provides a method and apparatus for detecting biasing faults within components for electrophotographic equipment including: open load, over load, shorted load and intermittent contact with the load or arcing conditions, as well as power supply output failure in a bias system.

A digital signal is provided to a machine control system indicative of a biasing condition within a component. The machine control system can sense the signal by either interrupt or polling (periodic sampling) methods. The sensed signal can be appropriately filtered with software. The result is that all of these bias failures may be detected automatically by machine control, thus preventing the machine from producing additional prints with degraded image quality. The system also provides a method to alert the operator service personnel on which area of the machine to service. This is particularly useful for enabling the operator to replace cartridges in the machine that need replenishment. In a machine with multiple imaging modules, with each of the modules having multiple loads that are biased, a fault analysis system is necessary to enable efficient servicing of the machine. The present invention addresses the problems within the prior art by providing an indication that a problem has occurred in order that action may be taken to prevent image quality defects.

The invention employs a feedback of the load bias potential to the source of the potential for voltage-regulated biases. This feedback may be repeated for a multiplicity of loads and sources throughout a system. The feedback from the load is compared with the expected output of the bias source. If the difference between the expected bias and the bias feedback from the load is beyond a predetermined range, the bias source will send a signal to the machine controller that indicates a bias fault has occurred. The invention allows for the bias potential to be adjusted automatically within the machine and for the fault detection limits to adjust to the new set point.

The present invention monitors the output voltage of the current regulated outputs via a sample of a scaled analog representation of the signal. When the voltage falls above or below a range defined in software, the machine control detects this as an error. The machine is shutdown when this occurs, and the operator/service person is informed of which system has indicated an error state.

BRIEF DESCRIPTION OF THE DRAWINGS

The invention and its objects and advantages will become apparent upon reading the following detailed description and upon reference to the drawings, in which.

DETAILED DESCRIPTION OF THE PREFERRED EMBODIMENTS

Figure 1:
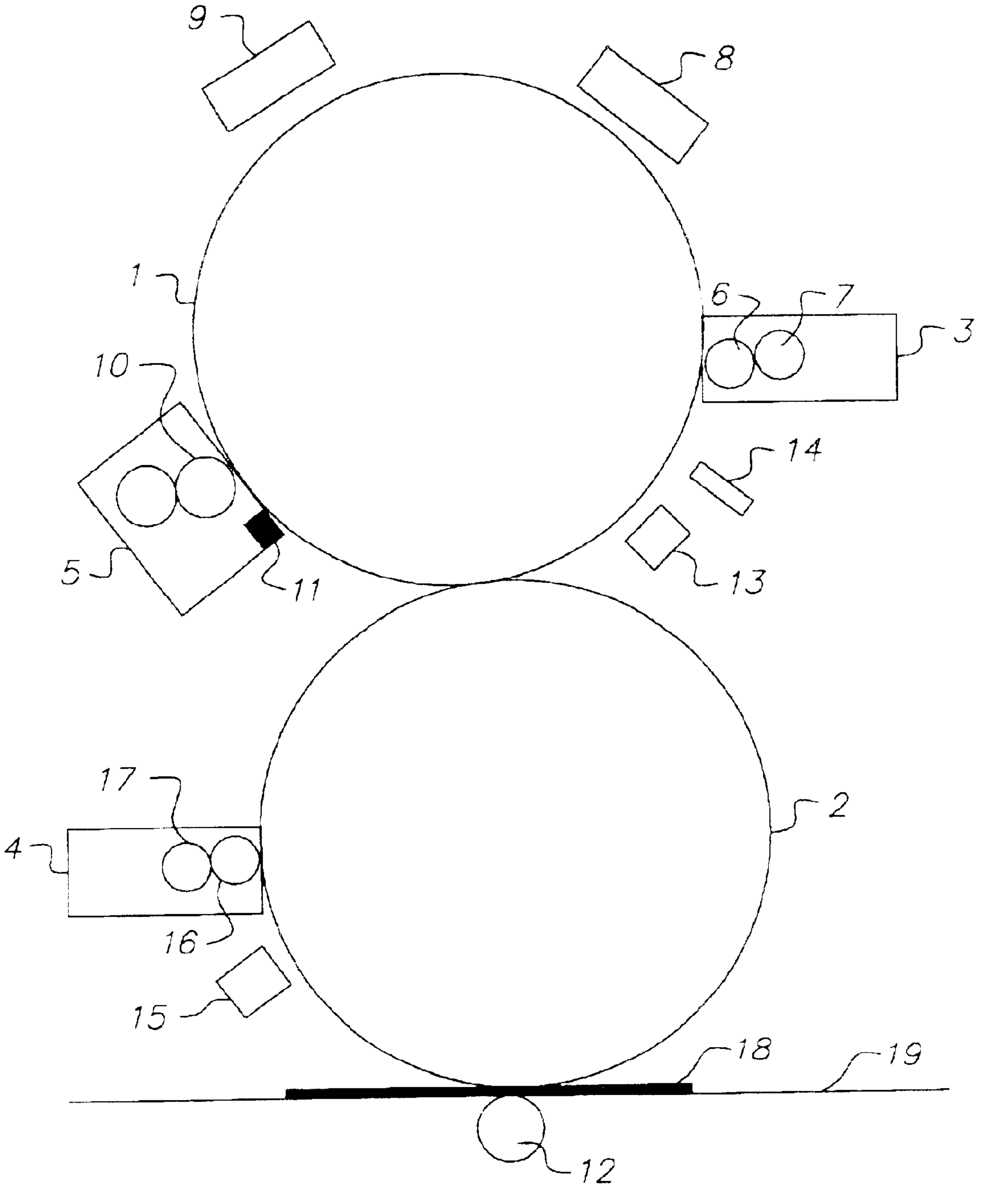
FIG. 1 is a depiction of the imaging system hardware, showing the biased components.

Referring to FIG. 1, which depicts the electrophotographic imaging system hardware showing the biased components, multiple components are biased at different potentials. The system employs a photoconductor drum 1 with toning station 5 that places a toner based image on photoconductor drum 1 and an electrostatic cleaning station 3 that removes residual toner from the photoconductor drum 1. A biased intermediate transfer drum 2, also having an electrostatic cleaning station 4, is positioned next to photoconductor drum 1 such that a transfer NIP is formed. The toner-based image is transferred from the photoconductor drum 1 to the intermediate transfer drum 2. The system shown in FIG. 1 has eight components that are each biased at a different level to accomplish their respective functions.

The photoconductor drum 1 is negatively charged by the primary charger 8. An image is written on the photoconductor drum 1 by printhead 9 by exposure to illumination from light emitting diodes on the printhead 9. At toning station 5 a mixture of negatively charged toner with positively charged carrier particles is presented to the photoconductor drum 1 in order to form a toner-based image. The mixture is transported on the shell of a roller 10, which is biased by a negatively offset AC waveform (not shown). The toner is electrostatically attracted to the image. Some toner, carrier and other contaminants may be attracted to the background (non-discharged) portion of the photoconductor. A scavenger plate 11 is biased with a negatively offset AC waveform. The scavenger plate 11 will electrostatically attract the positive carrier from the photoconductor drum 1 leaving the toner-based image on the photoconductor drum 1.

The intermediate transfer drum 2 is positively biased in order to attract the toner-based image from the photoconductor drum 1. The toner-based image is transported on the intermediate transfer drum 2 to a second transfer NIP between the intermediate transfer drum 2 and the transfer roller 12. An image receiver 18 is then carried on transport web 19 such that the receiver 18 passes between the intermediate transfer drum 2 and the transfer roller 12 within the second transfer NIP. The transfer roller is positively biased to drive a constant current into the intermediate transfer drum. The transfer roller 12 assists the toned image in being electrostatically transferred to the receiver 18.

In the above described process, after the transfer of a toner based image, the surface of the photoconductor drum 1 and its contaminants are negatively charged by a preclean corona charger 13 and then discharged by preclean light source 14 prior to cleaning. The photoconductor cleaning station 3 contains a conductive brush 6 that is biased at a positive potential relative to the surface of photoconductor drum 1. This forms an electrostatic offset that attracts contaminants from the surface of photoconductor drum 1 and onto the brush 6. The photoconductor cleaning station 3 also contains roller 7, which is biased positively with respect to the brush 6. The bias attracts the negatively charged contaminants from brush 6 to the more positively charged roller 7. The contaminants may be scraped from the roller by a skive 33 (not shown).

The surface of the intermediate transfer drum 2 is cleaned in similar fashion to the above-described process for the photoconductor drum 1. The surface of the intermediate transfer drum 2, and its contaminants, is negatively charged by a preclean corona charger 15. No discharge of the intermediate transfer drum 2 prior to cleaning is required because the intermediate transfer drum 2 is conductive. The intermediate transfer cleaning station 4 contains a conductive brush 16 biased with a positive potential relative to the intermediate transfer drum surface. This offset electrostatically attracts contaminants from the drum surface to the brush. The intermediate transfer drum cleaner also contains roller 17, which is biased positively with respect to the brush. The bias attracts the negatively charged contaminants to the more positively charged roller. The contaminants may be scraped from the roller by a skive 34 (not shown).

It should be apparent from the foregoing discussion that proper biasing of components within an electrophotographic system is very important. Therefore, the present invention endeavors at addressing the problems within the prior art for identifying potential problems within rotating biased components. From the discussion relating to FIG. 1 above, there are clearly numerous rotating components that are rotating resulting in wear of these components. Therefore, the system of the present invention employs diagnostics directly at the point of the rotating biased components to provide status feedback to the machine's control unit. The biasing can then be adjusted according to predetermined biasing levels. In the event that the status indicates a bias fault has occurred, the system then responds to this fault signal, making it possible to stop imaging and alert the machine operator that bias faults may adversely affect the image quality of the prints being produced.

Figure 2:
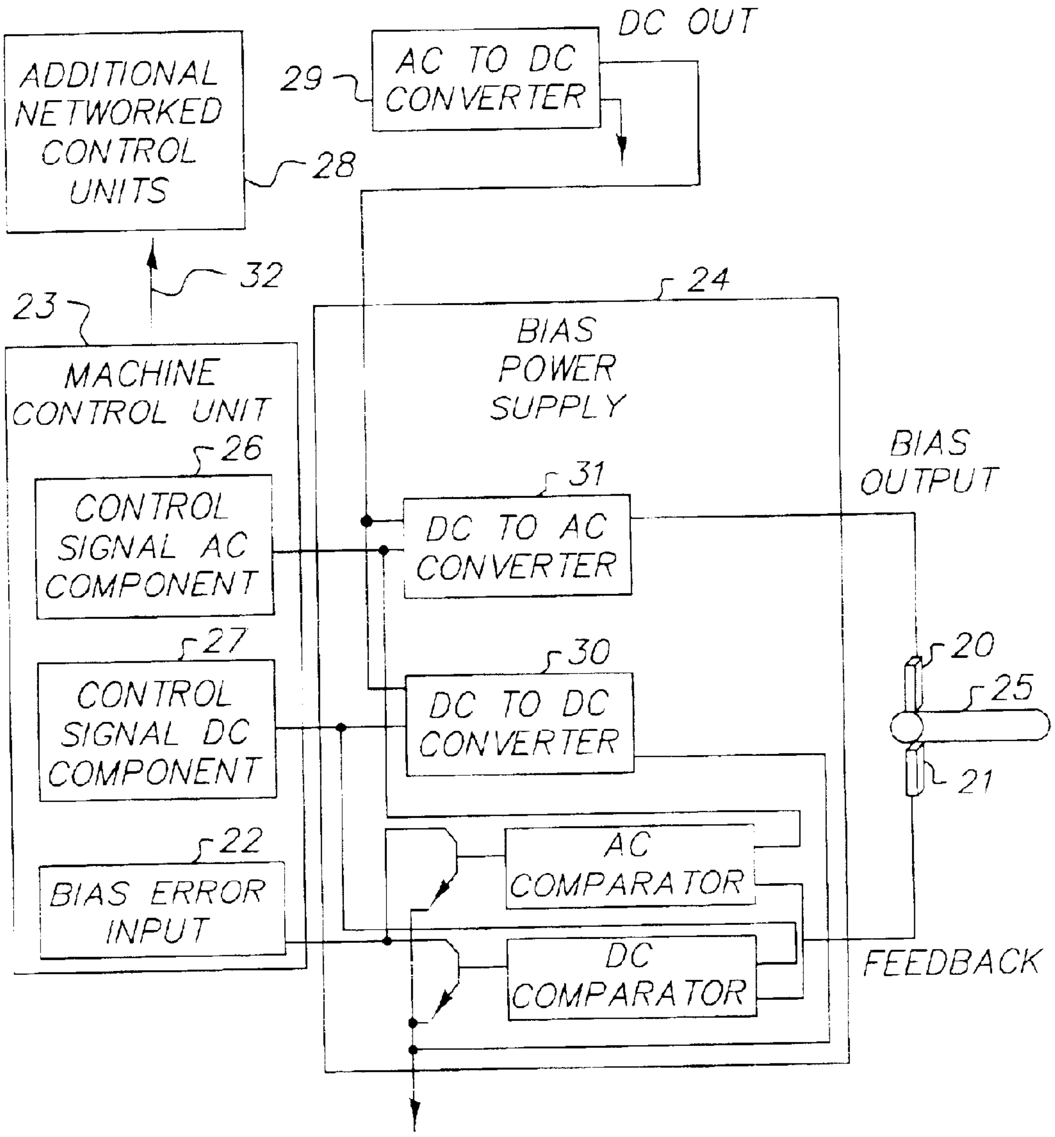
FIG. 2 is a depiction of a voltage regulated bias control and diagnostic configuration.

FIG. 2 illustrates a typical bias control, source, feedback and diagnostic signal used for the voltage regulated loads in the system of the present invention. The voltage-regulated loads include the intermediate transfer drum, the brushes and rollers in the photoconductor and intermediate transfer drum cleaners and the roller and scavenger plate in the toning station.

The machine control unit 23 generates analog voltage signals to provide for the AC Component 26 and the DC Component 27 used to set the bias potential for the load that is going to be monitored. Bias output and feedback paths exist at the bias power supply 24 output. In alternate embodiments the signal could be a parallel signal, a serial digital signal or a pulse width modulated signal. The power supply 24 produces the appropriate bias for the load. The preferred embodiment illustrated in FIG. 2 represents an output from the power supply 24 that has an AC Component 26 and a DC Component 27. This results in a bias output in the form an AC output signal riding on a DC offset, which is then applied to the toning roller 25.

The machine control unit 23 provides separate control signals for the AC and DC components 26, 27 of the bias. The AC to DC converter 29 provides DC input power to the bias supply power supply 24 DC-to-DC converter 30 and/or AC to DC converter 31. The feedback signal from the load will also have AC and DC components, which are used by the AC and DC comparators to determine the bias error input 22. As a result of the bias error input 22, the machine control unit 23 will digitally filter the signal by confirming that the error state exists for a programmed number of consecutive samples. If the error state meets the programmed sample limit, the machine control unit will issue a request to the networked control system to shutdown the machine and inform the operator/service personnel of the specific component bias system that has failed.

Internal to the machine control unit the bias error input 22 has an interface with the controls 26 and 27 such that, when the bias error input signal goes low, a software filter determines if error is significant. The software filter essentially compares the bias error with a predetermined value. If the determination of the software filter is that a significant error has occurred, then a software instruction is made for the system to shutdown. During the controlled shutdown the controls 26 and 27 are turned off as the power supply is shutdown.

The controls 26 and 27 provide analog signals to set the output levels of converters 30 and 31. The levels are set as part of the electrophotographic process control. Control 27 adjusts the DC bias level of the toning roller bias in order to control toning density. Control 26 adjusts the AC component of the bias per a predetermined ratio relative to the DC bias set point. The toning density is monitored by a transmission densitometer in the machine. The AC to DC converter 29 is simply the low voltage input power source to the high voltage power supplies. It does not interact with machine control other than to provide input power.

The power supply 24 delivers the bias to the load via a rotating connection, such as a spring-loaded carbon contact 20. A second spring-loaded carbon contact 21 is used to pick up the high voltage feedback signal from the load. This brush is connected back to the power supply where the feedback signal separated into its AC and DC components. The components are compared with the appropriate control signal. If the feedback signal is outside of a defined tolerance relative to the control signal a digital error signal (22) will be generated and sent to the machine control unit. The peak-to-peak amplitude of the AC component is controlled and monitored in this embodiment. Other characteristics of the AC component, such as the RMS voltage value or the frequency of the voltage oscillation, could be monitored by the feedback comparator. In the preferred embodiment, one signal will be sent, combining the bias error condition from both components. If either component is in error, the error signal will be sent. Alternately, both components could be provided with separate error signals.

The machine control unit can either poll the digital error signals or handle them on an interrupt basis. The application as described herein is that of the preferred embodiment that employs a polling method. Software filtering of the signals is employed to prevent unnecessary error signals. Certain parameters are used by the software filter to make a determination of the necessity of generating an error message to the operator or service personnel. In the preferred embodiment, these parameters are sampling rate and the required quantity of consecutive samples in the error state. Once a predetermined threshold of these parameters is reached, then an error message is generated. The sample filter also contains a parameter to suspend the error checking for a fixed period of time after the power supply has been enabled or the bias potential has been adjusted, in order to allow the power supply to settle into regulation. Upon a determination by the machine control that a bias error has occurred, the operator and/or service personnel are directed to the subsystem where the problem is sensed. In a machine with multiple imaging modules, there may be multiple control units 28 connected through a computer network connection 32 such as an arcnet network. One or more of these networked control units 28 may provide an interface to the machine operator or service personnel to provide the bias fault status.

Figure 3:
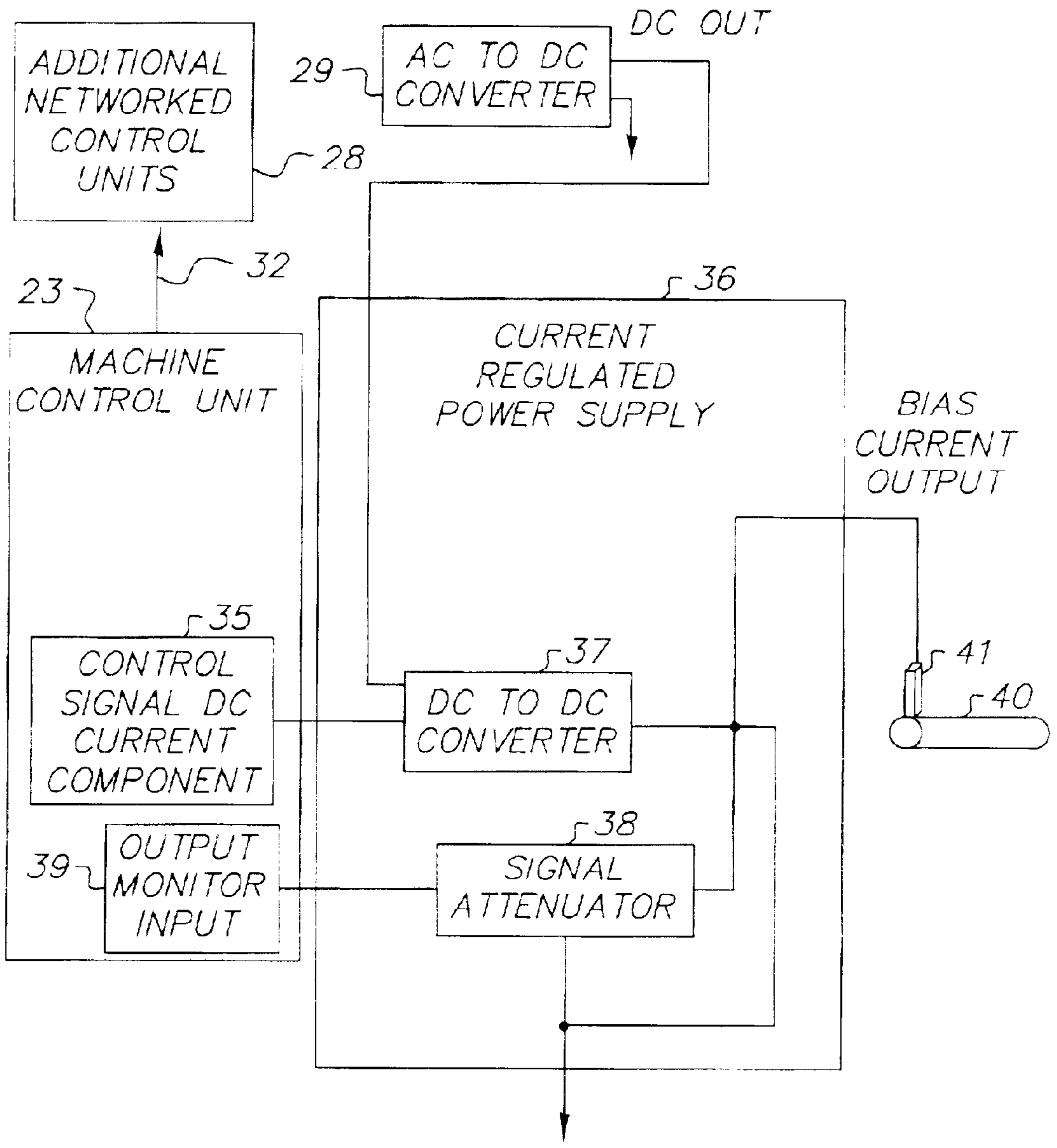
FIG. 3 is a depiction of a current regulated bias control and diagnostic configuration.

FIG. 3 illustrates a typical bias control, source, feedback and diagnostic signal used for the current regulated loads in the system of the present invention. The current regulated loads described in FIG. 1 are the transfer roller 12 and the corona chargers 13 and 15. FIG. 3 depicts the bias control that is used for transfer roller 12. The machine control unit 23 provides an analog control signal from the DC Current Component 35 to the DC-to-DC converter 37 within the current regulated power supply 36 to define the regulated current level. The AC to DC converter 29 provides the input power to the current regulated power supply 36. The DC-to-DC converter 37 adjusts the voltage of the power supply output to provide the output current level requested by the machine control unit 23. The output current is applied to the bias component, in this case the transfer roller 12 via a brush 41. The signal attenuator 38 divides the output voltage down to a 0–10 Vdc level. It is this divided voltage, which is feedback to the machine control unit 23 via the output monitor input 39. The output monitor input 39 performs an analog to digital conversion. The machine control unit 23 contains software that samples the digitized value of the output monitor 39. The software performs a comparison on the sampled value to determine whether or not it falls within the predetermined acceptable range. Software filtering of the signals is employed to prevent unnecessary error signals. Certain parameters are used by the software filter to determine if it is necessary to generate an error message to the operator or service personnel. In the preferred embodiment, these parameters are sampling rate, the required quantity of consecutive samples in the error state and the acceptable voltage range. Once a predetermined threshold of these parameters is reached, then an error message is generated. The sample filter also contains a parameter to suspend the error checking for a fixed period of time after the power supply has been enabled or the bias potential has been adjusted in order to allow the power supply to settle into regulation. Upon a determination by the machine control that a bias error has occurred, the operator and/or service personnel are directed to the subsystem where the problem is sensed. In a machine with multiple imaging modules there may be multiple control units 28 connected through a computer network connection (32) such as an arcnet network. One or more of these networked control units 28 may provide an interface to the machine operator or service personnel to provide the bias fault status.

The present invention provides advantages in a method and apparatus for detecting open load, over load, shorted load and intermittent contact with the load or arcing conditions, as well as power supply output failure in a bias system. The digital signal provided to the machine control system may be sensed by interrupt or sampling methods and filtered appropriately with software. The result is that all of these bias failures may be detected automatically by machine control, thus preventing the machine from producing additional prints with degraded image quality. The system also provides a method to alert the operator service personnel on which area of the machine to service. This is particularly useful for enabling the operator to replace cartridges in the machine that need replenishment. In a machine with multiple imaging modules, each with multiple biased loads, such a system is necessary to enable efficient servicing of the machine. Without employing the system described here, the indicator that a problem has occurred is the occurrence of image quality defects. In a system that uses multiple imaging units to produce multi-color images, it can be very difficult to determine where a fault is occurring just by evaluating the image defects.

The foregoing discussion details the best mode known to the inventor for practicing the invention. Modifications to the best mode will be obvious to those skilled in the art.

Therefore, the scope of the invention should be measured by the appended claims.

| Parts List |
|---|
| 1. photoconductor drum |
| 2. intermediate transfer drum |
| 3. electrostatic cleaning station |
| 4. electrostatic cleaning station |
| 5. toning station |
| 6. conductive brush |
| 7. roller |
| 8. primary charger |
| 9. printhead |
| 10. roller |
| 11. scavenger plate |
| 12. transfer roller |
| 13. corona charger |
| 14. light source |
| 15. corona charger |
| 16. conductive brush |
| 17. roller |
| 18. receiver |
| 19. transport web |
| 20. spring loaded carbon contact |
| 21. spring loaded carbon contact |
| 22. digital error signal |
| 23. machine control unit |
| 24. bias power supply |
| 25. toning roller |
| 26. analog voltage signals |
| 27. analog voltage signals |
| 28. multiple control units |
| 29. AC to DC converter |
| 30. bias supply DC to DC |
| 31. bias supply DC to AC |
| 32. network connection |
| 33. skive |
| 34. skive |
| 35. analog voltage signals |
| 36. current regulated power supply |
| 37. current supply DC to DC |
| 38. signal attenuator |
| 39. analog voltage input |
| 40. transfer roller |
| 41. bias brush |

What is claimed is:

1. A method for automatic adjustment of multiple bias potentials comprising:

providing a networked system having a power supply with capabilities for monitoring biased components electrically connected to the power supply;

attaching a biased component to a feedback signal to observe potential through a biased load;

comparing the feedback signal to an expected bias potential; and controlling an output of the power supply in response to a feedback signal by adjusting the output of the power supply in response to the feed back signal.

2. The method of claim 1 wherein the comparing step further comprises comparing the feedback signal with a range of potentials as the expected bias potential.

3. The method of claim 2 wherein prior the step of comparing is performed digitization and software-filtering step on the feedback signal are performed.

4. The method of claim 1 wherein the step of attaching further comprises attaching the feedback signal to a rotating connection on the biased load.

5. The method of claim 4 wherein the step of attaching further comprises a spring loaded carbon contact as the rotating connection.

6. The method of claim 1 wherein the step of providing further comprises the system having multiple imaging modules attached to the power supply through multiple feed back signals.

7. The method of claim 6 wherein the step of attaching further comprises attaching the feedback signals to multiple biased components within each of the modules.

8. An integrated bias potential control and diagnostic system for use within an electrophotographic imaging that allows for automatic adjustment of multiple bias potentials and the sensing if those potentials for the purpose of controlling and monitoring the function of the imaging module comprising:

a) a networked system having facilities for controlling and monitoring at least one imaging module with at least one biased component;

b) a power supply having at least one control signal operatively connected to the bias load feedback;

c) a feedback connection connected to the biased load;

d) comparison means operatively connected to the power supply for comparing the bias feedback signal to an expected bias potential determined; and e) means responsive to the comparison means for taking corrective action when the bias feedback does not match the expected bias potential.

9. The system of claim 8 further comprising:

the means responsive to the comparison means further comprising a bias error signal provided from the power supply to a machine control system; and a software-filtering module that applies a predetermined set of parameter to the bias error signal to determine if an error should generated.

10. A method for detecting error conditions within a biased load:

providing a networked system having a power supply operatively configured to monitor biasing of components;

attaching a feedback signal to the power supply that observes current traveling from the power supply and through the biased component;

comparing the feedback signal to a set of predetermined parameters; and responding to the comparing step to determine the existence of an undesirable condition.

11. The method of claim 10 wherein the step of responding further comprises determining, as the undesirable condition, the existence of one of the following: open load, over load, shorted load intermittent contact with the load, arcing conditions, or power supply output failure.

12. The method of claim 10 wherein the step of responding further comprises controlling an output of the power supply in response to a feedback signal by adjusting the output of the power supply in response to the feed back signal.

13. The method of claim 10 wherein the step of comparing further comprises sensing the feedback signal by either interrupt or sampling prior comparing.

14. The methods of claim 10 wherein the step of responding further comprises a step of software filtering of the feedback signal.

15. The method of claim 14 wherein the step of software filtering further comprises a step of digital filtering the feedback signal to determine if an error state exist, the step of digital filtering further comprising sampling the feedback signal for a predetermined number of consecutive samples.

16. The method of claim 14 wherein the step of software filtering further comprises the step sampling the feedback signal to determine if a biasing error exists and determining if the biasing error is significant then instructing the system to shutdown.

17. The method of claim 10 wherein the step of providing further comprises as one of the monitored components a toning roller and the step of responding further comprises adjusting bias level to control a toner biasing level for the toning roller.

18. The method of claim 17 wherein the biasing levels are set as part of the electrophotographic process control including a DC bias level of the toning roller bias to control toning density and an AC component of the bias per a predetermined ratio relative to the DC bias set point.

19. The method of claim 18 wherein the toning density is monitored by a transmission densitometer in the system.

* * * * *